(12) United States Patent
Stieber

(10) Patent No.: US 10,989,448 B2
(45) Date of Patent: Apr. 27, 2021

(54) SUBLIMATOR HAVING A POROUS PLATE WITH INTEGRAL PRIMARY AND SECONDARY HEAT TRANSFER SURFACES

(71) Applicant: Hamilton Sundstrand Corporation, Charlotte, NC (US)

(72) Inventor: Jesse Joseph Stieber, Avon, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 16/747,151

(22) Filed: Jan. 20, 2020

(65) Prior Publication Data

US 2020/0149786 A1     May 14, 2020

Related U.S. Application Data

(62) Division of application No. 15/171,235, filed on Jun. 2, 2016, now Pat. No. 10,539,345.

(51) Int. Cl.
| | |
|---|---|
| *F25B 19/00* | (2006.01) |
| *F28D 5/00* | (2006.01) |
| *F28F 3/04* | (2006.01) |
| *F28F 13/00* | (2006.01) |
| *F28D 21/00* | (2006.01) |

(Continued)

(52) U.S. Cl.
CPC ............. *F25B 19/00* (2013.01); *F28D 5/00* (2013.01); *F28F 3/04* (2013.01); *F28F 13/003* (2013.01); *B33Y 10/00* (2014.12); *B33Y 80/00* (2014.12); *F28D 2021/0021* (2013.01)

(58) Field of Classification Search
CPC . F25B 19/00; F28F 3/04; F28F 13/003; F28D 5/00; F28D 2021/0021; F28D 21/0015

USPC ....... 165/80.2, 80.4, 104.19, 104.21, 104.26, 165/104.33
See application file for complete search history.

(56) References Cited

U.S. PATENT DOCUMENTS

| | | | |
|---|---|---|---|
| 3,014,353 A | 12/1961 | Scully et al. | |
| 3,170,303 A * | 2/1965 | Rannenberg | ............ F25B 19/00 62/98 |

(Continued)

FOREIGN PATENT DOCUMENTS

CN     104019685 A     9/2014

OTHER PUBLICATIONS

Chapman, Alan J., "A Fundamental Study of Sublimation Through a Porous Surface," Jun. 30, 1971, Rice University prepared for MASA Manned Spacecraft Center, Houston, Texas.

(Continued)

*Primary Examiner* — Henry T Crenshaw
*Assistant Examiner* — Kamran Tavakoldavani
(74) *Attorney, Agent, or Firm* — Carlson, Gaskey & Olds, P.C.

(57) ABSTRACT

A sublimator includes a porous plate having a first surface comprising a low pressure side and a second surface comprising a high pressure side such that refrigerant is configured to move through the porous plate from the high pressure side to the low pressure side. The second surface defines a primary heat transfer surface. The porous plate further includes a plurality of secondary heat transfer surfaces integrally formed on the primary heat transfer surface to facilitate flow and evenly distribute refrigerant across the high pressure side of the porous plate.

13 Claims, 2 Drawing Sheets

(51) Int. Cl.
 B33Y 10/00 (2015.01)
 B33Y 80/00 (2015.01)

(56) References Cited

U.S. PATENT DOCUMENTS

| | | | |
|---|---|---|---|
| 3,197,973 | A | 8/1965 | Rannenberg et al. |
| 3,479,838 | A | 11/1969 | Bitterly |
| 4,007,601 | A | 2/1977 | Webbon |
| 5,946,931 | A | 9/1999 | Lomax et al. |
| 7,604,782 | B1 * | 10/2009 | Dingell .................. F25B 19/00 23/294 R |
| 7,810,552 | B2 | 10/2010 | Slaughter |
| 8,240,361 | B2 * | 8/2012 | Behrens .................. F28F 7/02 165/80.4 |
| 2013/0255303 | A1 | 10/2013 | Sato et al. |
| 2015/0197858 | A1 | 7/2015 | Corbeil et al. |
| 2015/0289413 | A1 * | 10/2015 | Rush .................. H05K 7/20672 361/700 |

OTHER PUBLICATIONS

Leimkuehler, Thomas O. et al., "Developlemt of Contaminant Insensitive Sublimator," SAE Technical Paper Series, Jul. 17, 2006, vol. 1.

Leimkuehler, Thomas O. et al., "Investigation of Transient Sublimator Performance," SAE Technical Paper Series, Jul. 12, 2009, vol. 1.

NASA, "NASA Tech Brief—Modular Porous Plate Sublimator (MPPS) Requires Only Water Supply for Coolant Water Inlet Component Mounting Surface," Sep. 30, 1966, pp. 66-10409.

Sangiovanni et al., "Porous Plate Water Boiler Design Study," May 20, 1965, Windsor Locks, Connecticut.

Shero, James Philip, "Porous Plate Sublimator Analysis," Nov. 30, 1969, Rice University, Houston, Texas.

Sheth, Rubik et al., "Investigation of Transient Performance of a Sublimator," 40th International Conference on Environmental Systems, Jul. 11, 2010, Reston, Virginia.

Sheth, Rubik et al., "Experimental Investigation of Transient Sublimator Performance," 41st International Conference on Environmental Systems, Jul. 17, 2011.

Sheth, Rubik et al., "Sublimator Driven Coldplate Engineering Development Unit Test Results," 40th International Conference on Environmental Systems, Jul. 11, 2010, Reston, Virginia.

Lutz, Charles C. et al., "Apollo Experience Report—Development of the Extravehicular Mobility Unit," NASA Technical Note, Nov. 30, 1975, Houston, Texas.

Tongue, Stephen et al., "The Porous Plate Sublimator as the X-38/CRV (Crew Return Vehicle) Orbital Heat Sink," SAE Technical Paper Series, Jul. 12, 1999, vol. 1.

Wang, Yu-Ying et al., "Numerical and Experimental Study on the Heat and Mass Transfer of Porous Plate Water Sublimator with Constant Heat Flux Boundary Condition," Applied Thermal Engineering, Apr. 1, 2014, vol. 67, No. 1, pp. 469-479.

European Search Report for European Application No. 17165326.4 dated Oct. 19, 2017.

* cited by examiner

SUBLIMATOR HAVING A POROUS PLATE WITH INTEGRAL PRIMARY AND SECONDARY HEAT TRANSFER SURFACES

CROSS-REFERENCE TO RELATED APPLICATIONS

This application is a divisional of U.S. patent application Ser. No. 15/171,235 filed on Jun. 2, 2016.

BACKGROUND OF THE INVENTION

The present invention generally relates to a sublimator and a method of making a sublimator, and more specifically to a sublimator having a porous plate with integrally formed primary and secondary heat transfer surfaces.

A sublimator takes a fluid to be cooled and transfers the heat contained therein to a refrigerant that is sublimated. Traditionally, sublimators include a porous plate through which the refrigerant sublimates and a plurality of fins that are individually attached to the porous plate. Depending upon the application, there can be several thousand fins that are attached to the porous plate with each fin segment being incrementally spot welded to the porous plate in many locations. The spot welding is labor intensive and time consuming. Further, maintaining weld quality through this process requires constant tool maintenance and frequent quality inspections which increases overall manufactory cost.

SUMMARY OF THE INVENTION

According to one exemplary embodiment, a sublimator includes a porous plate having a first surface comprising a low pressure side and a second surface comprising a high pressure side such that refrigerant is configured to move through the porous plate from the high pressure side to the low pressure side. The second surface defines a primary heat transfer surface. The porous plate further includes a plurality of secondary heat transfer surfaces integrally formed on the primary heat transfer surface to facilitate flow and evenly distribute refrigerant across the high pressure side of the porous plate.

In a further embodiment of the above, the plurality of secondary heat transfer surfaces comprise a plurality of discrete features that are non-coplanar with the primary heat transfer surface and which are placed in a predetermined arrangement to optimize heat sink with heat flux input.

In another exemplary embodiment, a sublimator includes a refrigerant chamber having a first side and a second side, and further includes a fluid chamber positioned on the first side of the refrigerant chamber, wherein the fluid chamber is configured to receive a fluid to be cooled. A porous plate has a first surface comprising a low pressure side and a second surface comprising a high pressure side, wherein the high pressure side is positioned on the second side of the refrigerant chamber such that refrigerant is configured to move through the porous plate from the high pressure side to the low pressure side. The second surface of the porous plate defines a primary heat transfer surface, and the porous plate includes a plurality of secondary heat transfer surfaces integrally formed on the primary heat transfer surface to facilitate flow and evenly distribute refrigerant across the high pressure side of the porous plate.

In a further embodiment of any of the above, the sublimator includes an inlet to direct refrigerant into the refrigerant chamber to flow across the primary and secondary heat transfer surfaces, and further includes a refrigerant supply in fluid communication with the inlet to replenish refrigerant that sublimates from the low pressure side of the porous plate into an external environment.

In another exemplary embodiment, a method of making a sublimator includes providing a porous plate having a first surface comprising a low pressure side and a second surface comprising a high pressure side such that refrigerant is configured to move through the porous plate from the high pressure side to the low pressure side, and wherein the second surface defines a primary heat transfer surface, and integrally forming a plurality of secondary heat transfer surfaces on the primary heat transfer surface to facilitate flow and evenly distribute refrigerant across the high pressure side of the porous plate.

In a further embodiment of any of the above, the method includes using an additive manufacturing process to integrally form the plurality of secondary heat transfer surfaces on the primary heat transfer surface.

These and other features of the present invention can be best understood from the following specification and drawings, the following of which is a brief description.

DETAILED DESCRIPTION

Figure 1:
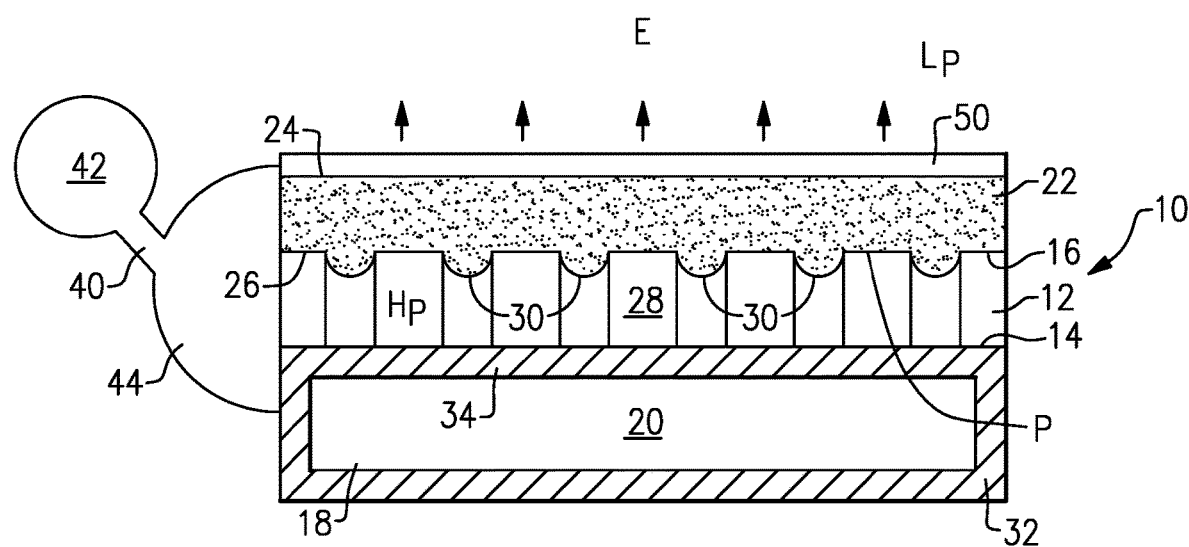
FIG. 1 shows a schematic representation of a sublimator with a porous plate incorporating the subject invention.

FIG. 1 shows a sublimator 10 that includes a refrigerant chamber 12 having a first side 14 and a second side 16. A fluid chamber 18 is positioned on the first side 14 of the refrigerant chamber 12. The fluid chamber 18 is configured to receive a fluid 20 to be cooled. A porous plate 22 has a first surface 24 comprising a low pressure side Lp and a second surface 26 comprising a high pressure side Hp. The high pressure side Hp is positioned on the second side 16 of the refrigerant chamber 12 such that refrigerant 28 is configured to move through the porous plate 22 from the high pressure side Hp to the low pressure side Lp. The second surface 26 of the porous plate 22 defines a primary heat transfer surface. The porous plate 22 also includes a plurality of secondary heat transfer surfaces 30 integrally formed on the primary heat transfer surface to facilitate flow and evenly distribute refrigerant across the high pressure side Hp of the porous plate 22.

The fluid chamber 18 comprises an area that is enclosed by a housing 32 that includes an intermediate plate portion 34 that is located between the refrigerant chamber 12 and the fluid chamber 18. While a single fluid chamber 18 and a single refrigerant chamber are shown, it should be understood that there could be additional fluid chambers 18 and additional refrigerant chambers 12. This will be discussed in greater detail below.

The sublimator 10 includes an inlet 40 to direct the refrigerant 28 into the refrigerant chamber 12 to flow across the primary and secondary heat transfer surfaces. A refrigerant supply 42 is in fluid communication with the inlet 40 to replenish refrigerant that sublimates from the low pressure side Lp of the porous plate 22 into an external environment E, such as outer space for example. A header 44 fluidly connects the inlet 40 to the refrigerant chamber 12.

Figure 2:
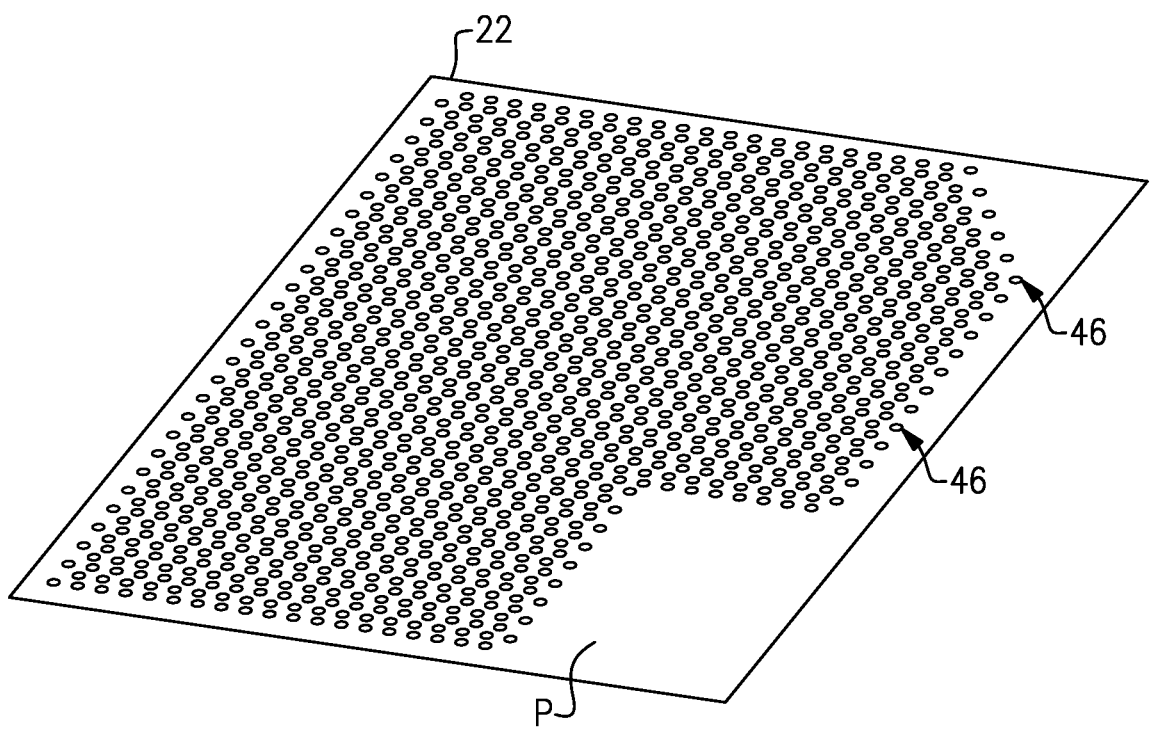
FIG. 2 is a perspective view of the porous plate as used in the sublimator of FIG. 1.
Figure 3:
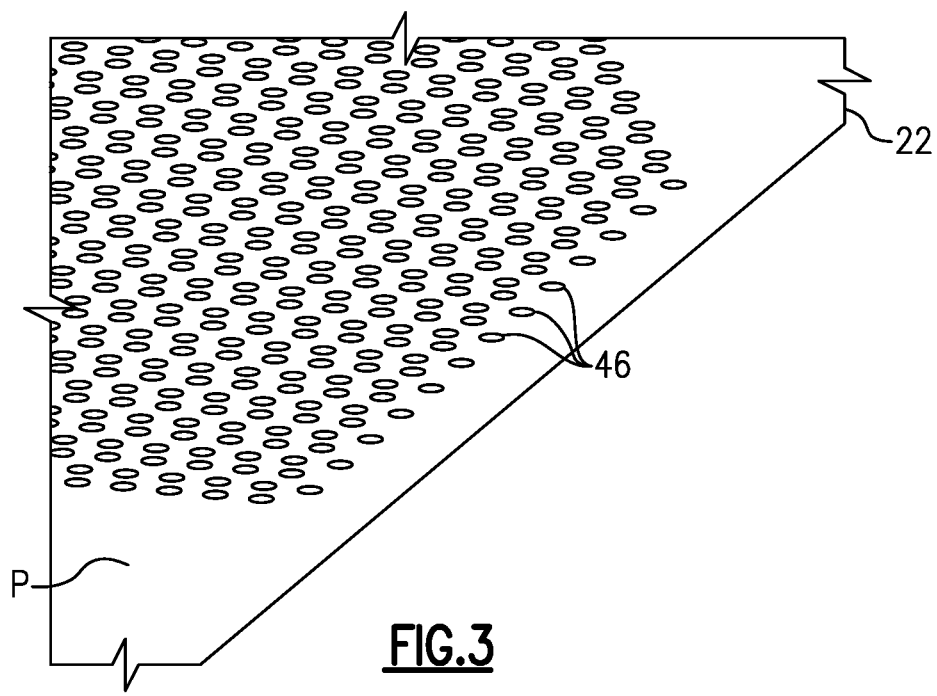
FIG. 3 is a magnified view of a portion of the porous plate of FIG. 2.

As shown in FIGS. 2-3, the plurality of secondary heat transfer surfaces 30 comprise a plurality of discrete features 46 that are non-coplanar with the primary heat transfer surface. Further, the discrete features 46 are placed in a predetermined arrangement to optimize heat sink with heat flux input. The discrete features 46 are integrally formed as one-piece with the porous plate 22 using an additive manufacturing process. This will be discussed in greater detail below. In one example, the discrete features 46 comprise a plurality of discrete protrusions or fins extending outwardly from the primary heat transfer surface. These features/fins are formed from a perforated or porous material such that the refrigerant can flow through the features in the manner described below.

The sublimator 10 is used with a refrigerant 28 that has a triple point where equilibrium of vapor, liquid, and solid will occur at a predetermined temperature or pressure and there is available an environment at or below this condition. In one example, the refrigerant 28 comprises water; however, other types of refrigerant could also be used. The refrigerant 28 is directed into the refrigerant chamber 12 from the pressurized supply 42. The refrigerant 28 then passes through the porous material that forms the porous plate 22 and freezes when exposed to the low pressure side Lp to form a layer of ice 50 that blocks further refrigerant 28 from exiting the low pressure side Lp of the porous plate 22.

The refrigerant 28 sublimates into the external environment E as heat is conducted to the porous plate 22 due to the heat exchange between the fluid 20 to be cooled and the refrigerant 28 in the refrigerant chamber 12. As the refrigerant 28 sublimates away from the porous plate 22 and the solid refrigerant becomes depleted, more refrigerant is automatically used to replenish the porous plate 22.

In one example, the porous plate 22 is comprised of a stainless steel material having a pore size of approximately 0.5 microns. Other types of porous materials could also be used; however, the material needs to have a porous characteristic that facilitates formation of the necessary layer of ice 50 for sublimation. Each pore essentially becomes plugged with ice that has a surface exposed to the outer space environment E. As sublimation occurs at this surface, the thickness of the layer of ice 50 is reduced until it can no longer support the internal pressure within the chamber 12 and the refrigerant will begin to pass into the external environment E. When the refrigerant is exposed to this lower pressure level below its triple point, the refrigerant freezes and reforms the ice.

In the example shown, the entire high pressure side Hp of the porous plate 22 is overlaid on the refrigerant chamber 12 to provide maximum exposure. The discrete features 46 formed on the porous plate further enhance flow and improve distribution across and through the porous plate 22. This allows the formation of a uniform sheet of ice 50 across the low pressure side Lp of the porous plate 22. The fluid 20 that is to be cooled transmits heat through the intermediate plate portion 34 and through the refrigerant 28 and eventually into the porous plate 22. The heat sublimates the ice at a rate that is directly proportional to the heat load and the fluid 20 to be cooled is discharged at a temperature that is lower than when the fluid entered the fluid chamber 18.

As discussed above, while only a single fluid chamber or passage 18 is shown in FIG. 1, the sublimator 10 can include multiple fluid passages in parallel. Adjacent to each fluid passage 18 is a refrigerant passage or chamber 12, which are fed by a common inlet header 44. The refrigerant flows in via the header 44 and exits the sublimator either by sublimation or evaporation depending on the "sink" temperature.

The "sink" is the porous plate 22, and as the range of heat flux into the porous plate 22 varies, the heat rejection capability of the sublimator moves coincidently. This relationship drives the demand for efficient integral construction of the refrigerant passage or chamber 12 with respect to the primary (porous plate surface) and secondary (protrusions/fins) heat transfer surfaces. Proper layout of the secondary heat transfer surfaces is essential to balancing the heat flux to heat sink temperature relationship. Maintaining a tight control band on the sink capacity will produce a fleet of sublimators with minimal unit to unit variability in heat rejection capability.

In current configurations, fins are spot welded to the porous plate in a fins per inch (FPI) arrangement to allow the sublimating refrigerant to overlay the entire surface of the porous plate which is subjected to an atmosphere whose pressure will cause the refrigerant to freeze. Varying the FPI allows control of the transmitted heat flux at sensitive locations on the porous plate. Spot welding perforated fin stock to the porous plate is a manufacturing method which leads to variability in the overall heat transfer effectiveness of a sublimator. Spot welding is a process with inherent quality instability. The process is labor intensive, time consuming and requires constant tool maintenance to stay within the required quality tolerance. Spot welding is used to provide a thermal and structural connection between primary and secondary heat transfer surfaces. The variability of quality in the small spot welds effects the ability of heat to transfer from the fluid to be cooled to the refrigerant within the porous plate. This poor connection equates to a larger device for a given heat load.

Within a given refrigerant passage, the heat flux will vary over the porous plate surface due to the flow arrangement of the passage of the fluid to be cooled. A large heat flux in a localized area will result in a failure of the ice layer, which impedes the self-regulating nature of the sublimation process within the sublimator and allows carry-over of the refrigerant. The FPI of a porous plate can be varied to reduce the effectiveness of a region on the surface of the porous plate to prevent this breakdown of the sublimation process. However, spot welding the fins to the plate to achieve the variable FPI increases labor costs.

The subject invention provides a sublimator 10 with a single part that has integral primary and secondary heat transfer features. This eliminates the thermo-mechanically joined plate and fin configuration. A variety of additive manufacturing methods can be used to produce the integrally formed primary and secondary heat transfer surfaces. The process is used to form or grow the discrete features 46 directly on the porous plate 22. Processes such as laser-sintering, stereolithography, and fused deposition modeling are just some of the example processes that could be used to integrally form the features on the porous plate. The shape, size, location and density of the features can be varied as needed to produce the optimum heat sink characteristics to precisely match the heat flux input.

By eliminating spot welding and tailoring the shape, size, location and density of the features to increase the heat transfer efficiency, the size and weight of the sublimator can be reduced. Further, performance of the sublimator becomes more consistent with a lighter and higher performing unit in less volume. Also, labor and manufacturing costs are significantly decreased as manufacturing complexity is reduced and quality assurance verification procedures are not required as frequently compared to prior designs.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The invention claimed is:

1. A method of making a sublimator comprising the steps of:
   providing a porous plate having a first surface comprising a low pressure side and a second surface comprising a high pressure side such that refrigerant is configured to move through the porous plate from the high pressure side to the low pressure side, and wherein the second surface defines a primary heat transfer surface; and
   integrally forming a plurality of secondary heat transfer surfaces on the primary heat transfer surface to facilitate flow and evenly distribute a refrigerant across the high pressure side of the porous plate, wherein the plurality of secondary heat transfer surfaces comprise a plurality of discrete protrusions extending outwardly from the primary heat transfer surface.

2. The method according to claim 1 including using an additive manufacturing process to integrally form the plurality of secondary heat transfer surfaces on the primary heat transfer surface.

3. The method according to claim 1, wherein the porous plate is comprised of a stainless steel material.

4. The method according to claim 1, wherein the porous plate has a pore size of approximately 0.5 microns.

5. The method according to claim 1, wherein the porous plate is comprised of a stainless steel material having a pore size of approximately 0.5 microns.

6. The method according to claim 1, including providing a refrigerant chamber having a first side and a second side, a fluid chamber positioned on the first side of the refrigerant chamber, and a housing that encloses the fluid chamber and includes an intermediate plate portion that is located between the refrigerant chamber and the fluid chamber.

7. The method according to claim 1, including forming the plurality of discrete protrusions from a porous material.

8. The method according to claim 6, including positioning the primary heat transfer surface of the porous plate on the second side of the refrigerant chamber.

9. The method according to claim 8, including configuring the fluid chamber to receive a fluid to be cooled and connecting a refrigerant supply to an inlet into the refrigerant chamber.

10. The method according to claim 9, providing a header to fluidly connect the inlet to the refrigerant chamber.

11. The method according to claim 8, including forming the plurality of secondary heat transfer surfaces from a porous material.

12. A method of making a sublimator comprising the steps of:
    providing a porous plate having a first surface comprising a low pressure side and a second surface comprising a high pressure side such that refrigerant is configured to move through the porous plate from the high pressure side to the low pressure side, and wherein the second surface defines a primary heat transfer surface;
    integrally forming a plurality of secondary heat transfer surfaces on the primary heat transfer surface to facilitate flow and evenly distribute a refrigerant across the high pressure side of the porous plate
    forming the plurality of secondary heat transfer surfaces as a plurality of discrete features that are non-coplanar with the primary heat transfer surface and positioning the plurality of discrete features in a predetermined arrangement to optimize heat sink with heat flux input; and
    using an additive manufacturing process to integrally form the plurality of secondary heat transfer surfaces on the primary heat transfer surface.

13. The method according to claim 12 including forming the plurality of discrete features as a plurality of protrusions extending outwardly from the primary heat transfer surface.

* * * * *